United States Patent [19]

Ban

[11] Patent Number: 5,247,697
[45] Date of Patent: Sep. 21, 1993

[54] PACKET SWITCHED NETWORK HAVING ONLINE DEVICE FOR PERFORMING OPERATIONS USING USER IDENTIFICATION CODE INCLUDED IN FACILITY FIELD OF CALL PACKET

[75] Inventor: Takayuki Ban, Tokyo, Japan
[73] Assignee: NEC Corporation, Tokyo, Japan
[21] Appl. No.: 750,594
[22] Filed: Aug. 28, 1991

[30] Foreign Application Priority Data

Aug. 29, 1990 [JP] Japan .................................. 2-228777

[51] Int. Cl.⁵ .......................................... G06F 13/00
[52] U.S. Cl. .................................... 395/800; 395/325; 395/200; 364/241.8; 364/242.96; 364/284.4; 364/285.4; 364/DIG. 1
[58] Field of Search ............... 395/325, 375, 425, 575, 395/800, 200

[56] References Cited

U.S. PATENT DOCUMENTS

| | | | |
|---|---|---|---|
| 4,783,731 | 11/1988 | Miyazaki et al. | 395/425 |
| 4,799,153 | 1/1989 | Hann et al. | 395/375 |
| 4,930,128 | 5/1990 | Suzuki et al. | 371/12 |
| 4,977,500 | 12/1990 | Ogata et al. | 395/575 |
| 5,113,499 | 5/1992 | Ankney et al. | 315/325 |

Primary Examiner—Robert B. Harrell
Assistant Examiner—Alpesh M. Shah
Attorney, Agent, or Firm—Foley & Lardner

[57] ABSTRACT

In an online processing device connected to a packet switched network which is supplied with a call signal from a data terminal unit used by a plurality of users, the data terminal unit supplies the packet switched network with the call signal which carries an identification code specific to each of users. The packet switched network supplies the online processing device with a call packet signal carrying the identification code. The online processing device includes a memory section for memorizing a plurality of identification number codes which are different from one another. A reading section is supplied with the identification code carried by the call packet signal and reads the identification codes as identifying codes from the memory section. An operating section puts a processing section into operation to carry out an online processing operation on the processing section and the data terminal unit through the packet switched network when one of the identifying codes is coincident with the identification code.

8 Claims, 3 Drawing Sheets

PACKET SWITCHED NETWORK HAVING ONLINE DEVICE FOR PERFORMING OPERATIONS USING USER IDENTIFICATION CODE INCLUDED IN FACILITY FIELD OF CALL PACKET

BACKGROUND OF THE INVENTION

This invention relates to an online processing device for use in combination with a packet switched network.

An online processing device of the type described is connected to a packet switched network supplied with a call signal from a data terminal unit which may be used by a plurality of users. The packet switched network may be connected to a plurality of data terminal units which have terminal unit numbers specific to the data terminal units, respectively. For example, the unit number is equivalent to a data terminal equipment address.

The online processing device comprises a processing section for carrying out an online processing operation on itself and each of the data terminal units through the packet switched network.

A conventional online processing device further comprises a memory table for memorizing a plurality of unit number codes which correspond to the terminal unit numbers, respectively, and an operating section for putting the processing section into operation to carry out the online processing operation on the processing section and a specific data terminal unit of the data terminal units. The unit number codes are memorized in the memory table in advance.

In carrying out the online processing section on the processing section and the specific data terminal unit, the specific data terminal unit supplied the packet switched network with a call signal carrying a specific unit number assigned to the specific data terminal unit. The packet switched network is supplied with the specific unit number carried by the call signal and produces a packet call signal carrying the specific unit number to supply the online processing device with the packet call signal.

In the conventional online processing device, the operating section puts the processing operation into operation to carry out the online processing operation on the processing section and the specific data terminal unit through the packet switched network when the specific unit number is coincident with one of unit number codes memorized in the memory table.

When the specific data terminal unit is removed from a connection point and connected to another connection point in the packet switched network, the specific unit number is changed to a particular unit number which is different from the specific unit number. In addition, it is necessary to change the memory table to a different memory table having the particular unit number code which is equal to the particular unit number.

However, it is impossible to change the memory table to a different memory table when the processing section carries out the online processing operation in cooperation with one of data terminal units. In other words, it is necessary for the processing section to stop the online processing operation in cooperation with one of the data terminal units when the memory table is rewritten to the different memory table.

SUMMARY OF THE INVENTION

It is an object of this invention to provide an online processing device capable of carrying out an online processing operation without changing a memory table to a different memory table when a unit number is changed to another unit number.

Other objects of this invention will become clear as the description proceeds.

According to this invention, there is provided an online processing device for use in combination with a packet switched network supplied with a call signal from a data terminal unit used by a plurality of users. The data terminal unit is for supplying the packet switched network with the call signal which carries an identification code specific to each of the users. The packet switched network is for supplying the online processing device with a call packet signal carrying the identification code. The online processing device includes; processing means for carrying out an online processing operation in cooperation with the data terminal unit; memory means for memorizing a plurality of identification number codes which are different from one another; reading means responsive to the identification carried by the call packet signal for reading the identification number codes as identifying codes from the memory means; and operating means for putting the processing means into operation to carry out the online processing operation on the processing means and the data terminal unit through the packet switched network when one of the identifying codes is coincident with the identification code.

DESCRIPTION OF THE PREFERRED EMBODIMENT

Figure 1:
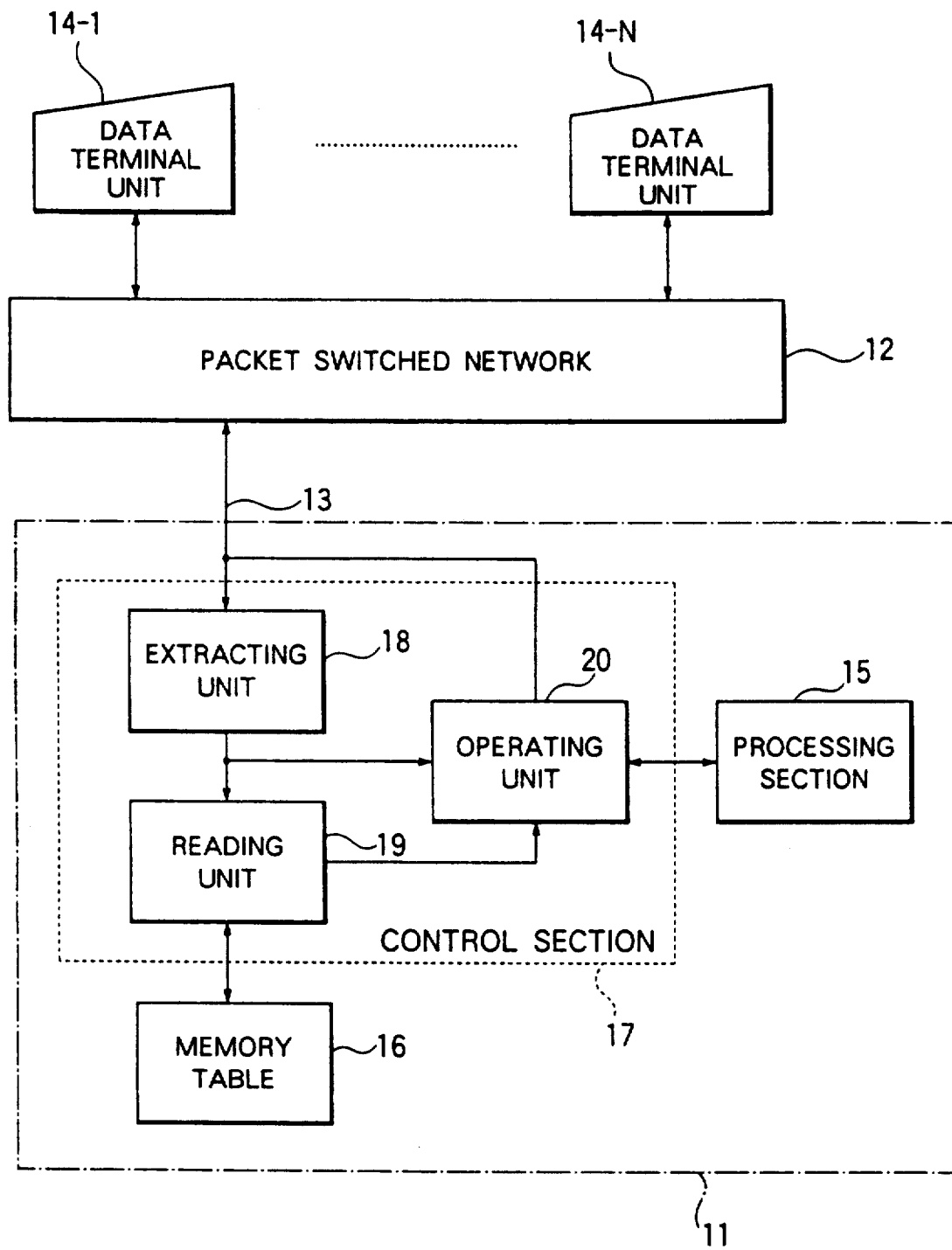
FIG. 1 is a block diagram of an online processing system comprising an online processing device according to an embodiment of this invention.

Referring to FIG. 1, an online processing device 11 according to a preferred embodiment of the present invention is connected to a packet switched network 12 through a packet signal line 13. The packet switched network 12 is connected to first through N-th data terminal units 14-1 to 14-N, where N represents a positive integer which is not less than one. The first through the N-th data terminal units 14 (suffixes omitted) have first through N-th unit number codes U1 to UN, respectively. The online processing device 11 has a device number code D. Each of the first through the N-th data terminal units 14 is used by first through M-th users which have first through M-th identification codes I1 to IM, respectively, where M represents a positive number which is not less than one. On carrying out an online processing operation on the online processing device 11 and each of the first through the N-th data terminal units 14, each of the first through the N-th data terminal units 14 supplies the packet switched network 12 with a call signal carrying one of the first through the M-th identification codes I1 to IM at a time as a transmission identification code. The packet switched network 12 supplies the online processing device 11 with a call packet signal carrying the transmission identification code as will be described hereinafter.

It will be assumed that the first data terminal unit 14-1 is used by the first user having the first identification code I1. On carrying out the online processing operation on the online processing device 11 and the first data terminal unit 14-1, the first user inputs the first identification code I1 to the first data terminal unit 14-1 by a keyboard switch (not shown). The first data terminal unit 14-1 supplies the packet switched network 12 with the call signal carrying the first identification code I1 as the transmission identification code. The call signal further carries the first unit number code U1 and the device number code D in addition to the first identification code I1.

Figure 2:
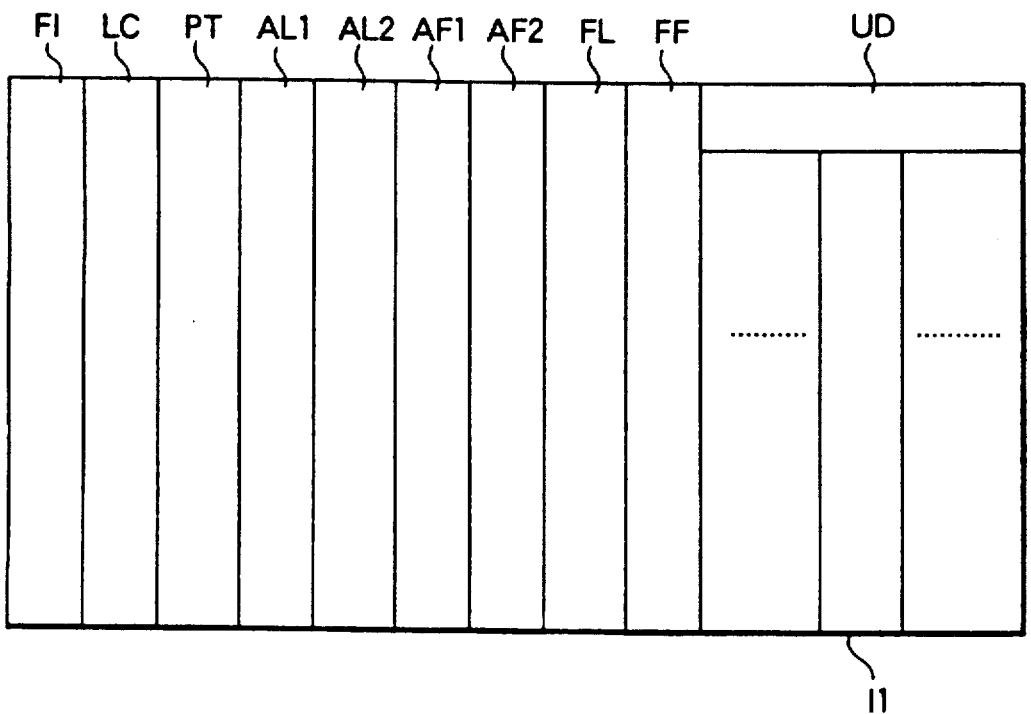
FIG. 2 is a signal format of a call signal used in the online processing system of FIG. 1.

Referring to FIG. 2, the call signal has a packet signal format defined by CCITT (The International Telegraph and Telephone Consultive Committee) Recommendation X.25. More particularly, the packet signal format comprises a general format identifier field FI for carrying a general format identifier, a logic channel identifier field LC for carrying a logic channel identifier, and packet type identifier field PT for carrying a packet type identifier. The packet signal format further comprises a first address length field AL1, a second address length field AL2, a first address field AF1, a second address field AF2, a facility length field FL, a facility field FF, and a call user data field UD. The first address length field AL1 is for carrying the number of octets of one of the first through the N-th unit number codes U1 to UN. The second address length field AL2 is for carrying the number of octets of the device number code D. The first address field AF1 are for carrying one of the first through the N-th unit number codes U1 to UN. The second address field AF2 is for carrying the device number code D. The facility length field FL is for carrying the number of octets of a facility defined by CCITT Recommendation X.25. The facility field FF is for carrying the facility. The call user data field UD is for carrying a user data. The first identification code I1 is carried in a selected one of the facility field FF and the call user data field UD. In the illustrated example, the first data terminal unit 14-1 selects the call user data field UD as the selected field. The first identification code I1 is carried in the call user data field.

Referring to FIGS. 1 and 2, the first data terminal unit 14-1 may select the facility field FF as the selected field. The first identification code I1 is carried in the facility field FF. In this event, the number of octets of the first identification I1 is carried in the facility length field FL. At any rate, the first identification code I1 is carried in either one of the facility field FF and the call user data field UD.

In FIG. 1, the packet switched network 12 is supplied with the call signal. The packet switched network 12 monitors the first and the second address fields AF1 and AF2. When the first and the second address fields AF1 and AF2 carry the first unit number code U1 and the device number D, respectively, the packet switched network 12 forms a connection path between the first data terminal unit 14-1 and the online processing device 11 by the packet signal line 13. Through the packet signal line 13, the packet switched network 12 supplies the online processing device 11 with a call packet signal which is equivalent to the call signal.

Reviewing FIG. 1, the online processing device 11 comprises a processing section 15, a memory table 16, and a control section 17. The processing section 15 is for carrying out an online processing operation in cooperation with each of the first through the N-th data terminal units 14. The memory table 16 is for memorizing first through M-th identification number codes C1 to CM which are different from one another. The control section 17 comprises an extracting unit 18, a reading unit 19, and an operating unit 20 as will be described in detail hereinafter.

Figure 3:
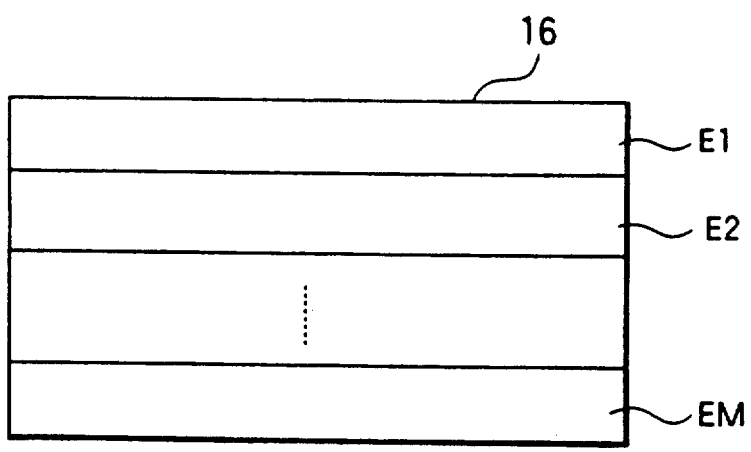
FIG. 3 is a content of an identification table used in the online processing device illustrated in FIG. 1.

Referring to FIG. 3, the memory table 16 has first through M-th user code areas E1 to EM which are for use in memorizing the first through the M-th identification number codes C1 to CM.

Figure 4:
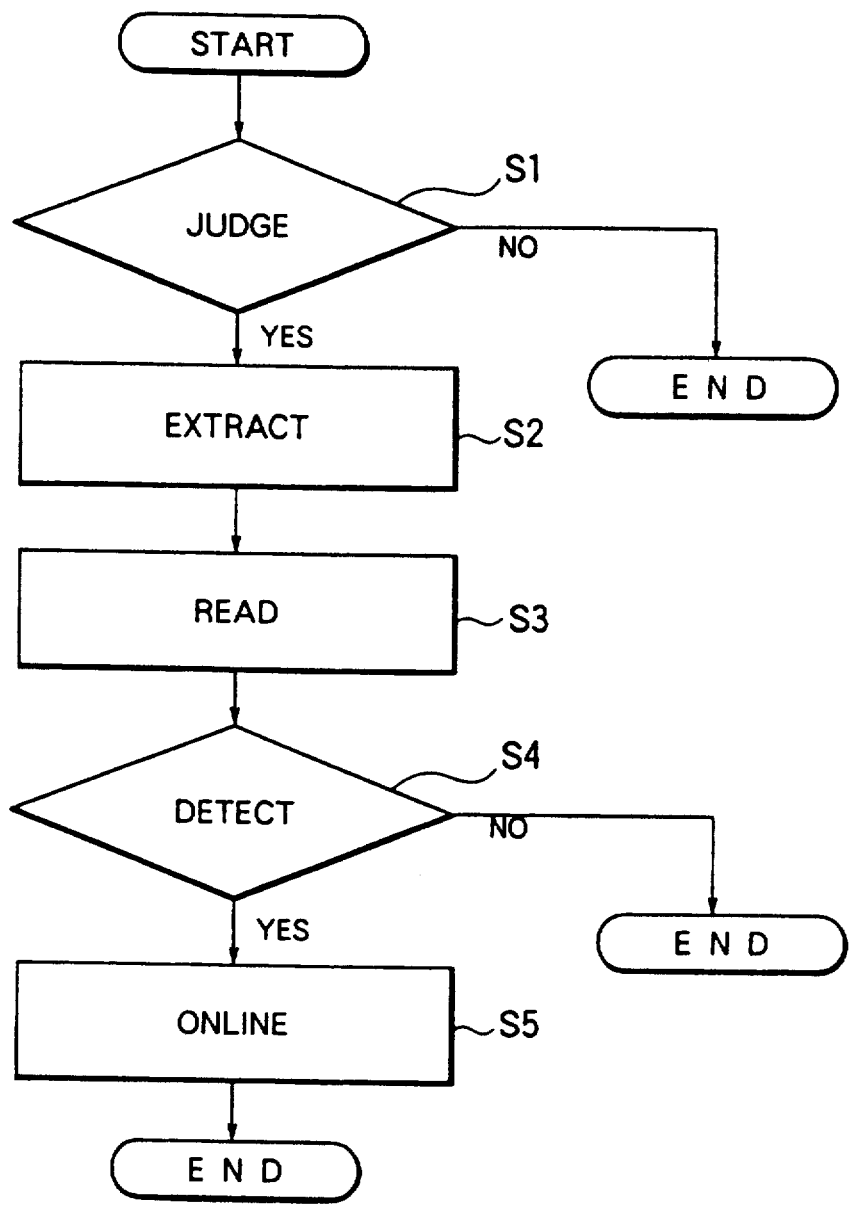
FIG. 4 is a flow chart for describing operation of the online processing device illustrated in FIG. 1.

Referring to FIG. 4 in addition to FIGS. 1 and 2, the extracting unit 18 is supplied with the call packet signal and monitors the call packet signal to judge whether or not the first identification code I1 is carried in the call user data field UD at a first step S1 labelled "JUDGE". When the first identification code I1 is carried in the call user data field UD, the extracting unit 18 extracts the first identification code I1 from the call packet signal to supply the first identification code I1 to the reading unit 19 and the operating unit 20 at a second step S2 labelled "EXTRACT". When none of the identification codes is carried in the call user data field UD, the first step S1 proceeds to an end. For example, the online processing device 11 does not carry out the online processing operation.

The reading unit 19 is responsive to the first identification code I1 and reads all of the identification number codes C1 to CM as identifying codes from the memory table 16 to supply the identifying codes to the operating unit 20 at a third step S3 labelled "READ". The operating unit 20 detects whether or not first identification code I1 is coincident with one of the identifying codes at a fourth step S4 labelled "DETECT". When the first identification code is coincident with one of the identifying codes, the operating unit 20 puts the processing section 15 into operation to carry out the online processing operation on the processing unit 15 and the first data terminal unit 14-1 through the packet switched network 12 at a fifth step S5 labelled "ONLINE". When none of identifying codes is coincident with the first identification code I1, the fourth step S4 proceeds to an end. For example, the online processing device 11 does not carry out the online processing operation.

Reviewing FIG. 1, the extracting unit 18 monitors the call packet signal to extract the first identification code from the facility field FF in case where the first identification code I1 is carried in the facility field FF. The first identification code I1 is supplied to the reading unit 19 and operating unit 20.

Although the first data terminal unit 14-1 supplies the packet switched network 12 with the call signal which carries the first identification code I1 on carrying out the online processing operation on the online processing device 11 and the first data terminal unit 14-1 in the embodiment described above, the first data terminal unit 14-1 may supply the packet switched network 12 with the call signal which carries one of the first through the M-th identification codes I1 to Im on carrying out the online processing operation on the online processing device 11 and the first data terminal unit 14-1. Similarly, each of the second data terminal units 14-2 to 14-N supplies the packet switched network 12 with the call signal which carries one of the first through the M-th identification codes I1 to IM on carrying out the online processing operation on the online processing device 11 and each of the second through the N-th data terminal units 14-2 to 14-N.

In conjunction with FIG. 2, the packet signal format may comprise a selected one of the facility field FF and the call user data field UD. In this event, the first identification code is carried in the selected field.

In the manner described in conjunction with FIG. 1, the online processing device 11 can continuously carry out the online processing operation in cooperation with one of the first through the N-th data terminal units 14 because use is made of the identification codes which are not relative to the unit number codes specific to the first through the N-th data terminal units 14, respectively, even if any one of the first through the N-th unit number codes is changed to another unit number code.

What is claimed is:

1. An online processing system comprising:
   a data terminal unit used by a plurality of users, wherein a plurality of identification codes are assigned to said users, respectively, said identification codes being different from one another, and wherein said data terminal unit outputs a call signal which includes an input identification code input by a user, said call signal having a packet signal format which includes a selected one of a facility field and a user data field as a selected field in which said input identification code is carried, said data terminal unit assigning said input identification code to one of said facility field and said user data field as said selected field to produce said call signal;
   a packet switched network receiving said call signal and outputting a call packet signal carrying said input identification code; and
   an online processing device receiving said call packet signal, comprising:
   processing means for carrying out an online processing operation in cooperation with said data terminal unit;
   memory means for memorizing a plurality of identification number codes which correspond to said identification codes;
   extracting means responsive to said call packet signal for extracting said input identification code as an extracted identification code from said call packet signal;
   reading means, receiving said extracted identification code, for reading said identification number codes as identifying codes out of said memory means;
   detecting means, receiving said extracted identification code from said extracting means and said identifying codes from said reading means, for detecting whether or not said extracted identification code is coincident with one of said identifying codes and outputting a coincidence signal; and
   operating means, receiving said coincidence signal, for putting said processing means into operation to carry out said online processing operation on said processing means and said data terminal unit through said packet switched network when said extracted identification code is coincident with one of said identifying codes.

2. An online processing device as claimed in claim 1, said data terminal unit having a terminal unit number specific to said data terminal unit, said online processing device having a device number specific to said online processing device, wherein:

said packet signal format further includes a first address field for carrying said terminal unit number and a second address field for carrying said device number;
   said packet switched network being for monitoring said first and said second address fields to form a connection path between said data terminal unit and said online processing device to thereby supply to said packet call signal to said online processing device.

3. An online processing device as claimed in claim 2, wherein said call packet signal is for further carrying said terminal unit number and said device number.

4. An online processing device as claimed in claim 1, said data terminal unit having a terminal unit number specific to said data terminal unit, said online processing device having a device number specific to said online processing device, wherein:

said packet signal format further comprises a first address field for carrying said terminal unit number and a second address field for carrying said device number;
   said packet switched network being for monitoring said first and said second address fields to form a connection path between said data terminal unit and said online processing device to thereby supply to said packet call signal to said online processing device.

5. An online processing device as claimed in claim 4, wherein said call packet signal is for further carrying said terminal unit number and said device number.

6. A method for online processing, comprising the steps of:
   inputting a user specific identification code as an input identification code to a data terminal unit;
   outputting from said data terminal a call signal which includes said input identification code, said call signal having a packet signal format which includes a selected one of a facility field and a user data field as a selected field in which said input identification code is carried, said input identification code being assigned to one of said facility field and said user data field by said data terminal unit as said selected field in said data terminal unit to be outputted as said call signal;
   receiving said call signal in a packet switched network;
   outputting from said packet switched network a call packet signal carrying said input identification code;
   receiving said call packet signal in an online processing device;
   extracting said input identification as an extracted identification code from said call packet signal;
   reading a plurality of stored identification number codes which correspond to a plurality of user specific identification codes, as identifying codes;
   detecting whether or not said extracted identification code is coincident with one of said identifying codes; and
   performing online processing on a processing section in said online processing device and said data terminal unit when said extracted identification code is coincident with one of said identifying codes.

7. A method for online processing as recited in claim 6, wherein said call signal further includes a first address field containing a terminal unit number specific to said data terminal unit and a second address field containing a device number specific to said online processing device.

8. A method for online processing as recited in claim 7, further comprising monitoring said first and said second address fields to form a connection path between said data terminal unit and said online processing device to thereby supply said call signal to said online processing device.

* * * * *